HYDRAULIC CONTROL CIRCUIT FOR SELF-LOADING SCRAPERS

Filed Aug. 1, 1963 3 Sheets-Sheet 1

INVENTORS.
JOHN A. JUNCK
JOSEPH KOKALY
BY SEBALD K. STAHL
Fryer and Tjensvold
ATTORNEYS

HYDRAULIC CONTROL CIRCUIT FOR SELF-LOADING SCRAPERS

Filed Aug. 1, 1963 3 Sheets-Sheet 2

INVENTORS.
JOHH A. JUNCK
JOSEPH KOKALY
BY SEBALD K. STAHL
ATTORNEYS

HYDRAULIC CONTROL CIRCUIT FOR SELF-LOADING SCRAPERS

Filed Aug. 1, 1963 3 Sheets-Sheet 3

INVENTORS.
JOHN A. JUNCK
JOSEPH KOKALY
SEBALD K. STAHL
BY Fryer and Tjensvold
ATTORNEYS 3,258,926

HYDRAULIC CONTROL CIRCUIT FOR SELF-LOADING SCRAPERS

John A. Junck and Joseph Kokaly, Joliet, and Sebald K. Stahl, Peoria, Ill., assignors to Caterpillar Tractor Co., Peoria, Ill., a corporation of California Filed Aug. 1, 1963, Ser. No. 299,259

2 Claims. (Cl. 60—97)

The present invention relates to hydraulic control circuits and more particularly to a hydraulic control circuit for a self-loading scraper.

Self-loading scrapers which include power driven elevators mounted in their front openings are finding increasing acceptance in the earth moving industry because of their ability to operate without the aid of a pusher tractor to assist during loading operations.

The power means for operating the scraper elevator have in the past been restricted for the most part to mechanical take-off means from the pulling tractor, or electric power means. The mechanical power take-off has inherent disadvantages in the rather complex mechanisms required to transfer mechanical power across the articulated connection between tthe pulling tractor and the scraper. Electrical power means have not proven altogether satisfactory due to the fact that they require special components not common to the environment of tractor drawn scrapers. By employing a hydraulically driven scraper elevator, power take-off from the tractor does not pose any special problems due to the ease with which hydraulic lines can span the articulated connection between the tractor and the scraper. The natural environment of a hydraulic power means in a tractor-scraper combination also makes an hydraulic drive very advantageous.

Besides the scraper elevator, there are two other major mechanisms which are hydraulically actuated and under control of the tractor operator. These mechanisms include means for adjusting the vertical position of the scraper bowl and means for ejecting material in the scraper bowl during the discharge portion of a work cycle. By virtue of the present invention and the novel arrangement of the components thereof, a pair of hydraulic pumps drawing fluid from a common reservoir supply the necessary hydraulic working fluid to position the scraper bowl, eject material from the bowl, and drive the scraper elevator at one of two speeds forward or one speed in reverse.

Accordingly, it is an object of the present invention to provide a hydraulic control circuit for a self-loading scraper having an elevator powered by a hydraulically driven motor.

It is another object of the present invention to provide hydraulically driven power means for a self-loading scraper elevator wherein the position of a single control element enables the loading elevator to be driven at one of two different speeds forward or in reverse.

It is a further object of the present invention to provide a hydraulic control system for a self-loading scraper wherein the scraper bowl elevating means, scraper ejection means and elevator drive means all share a common source of hydraulic pressure fluid.

Further and more specific objects and advantages of the invention are made apparent in the following specification wherein a preferred form of the invention is described by reference to the accompanying drawings.

Figure 1:
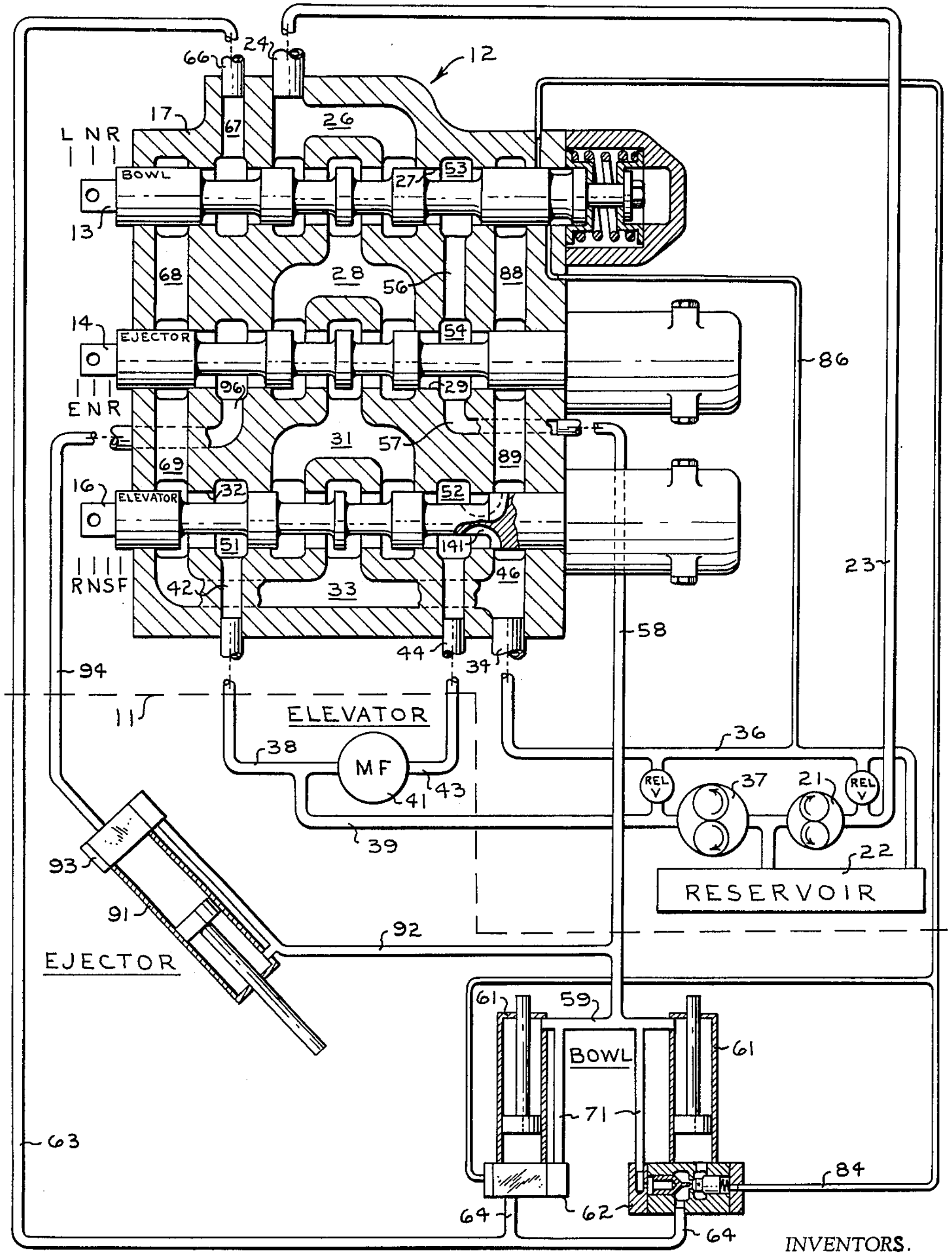
FIG. 1 is a schematic illustration showing the control system of the present invention in conjunction with bowl elevating means, ejection means, and an elevator motor.

Referring now to FIG. 1, a dashed line 11 separates the hydraulic system into two parts—the part shown above the line being situated on the tractor while the part shown below the line is situated on the scraper. A control valve group 12 on the tractor includes three valve spools 13, 14 and 16 each slidably disposed in valve body 17. Each of spools 13, 14 and 16 are manually positionable and control the operation of the scraper bowl, ejection means, and elevator, respectively.

A hydraulic pump 21 draws fluid from a reservoir 22 and delivers it via conduit 23 to an inlet 24 in valve body 17. Inlet 24 communicates with passage 26 which in turn communicates with valve bore 27 in which spool valve 13 is slidably disposed. On the downstream side of spool 13 valve bore 27 communicates with a passage 28 which is also in communication with a valve bore 29 in which valve bore 14 is slidably disposed. In communication with valve bore 29 on its downstream side is a passageway 31 which communicates with valve bore 32 in which valve spool 16 is slidably disposed. The downstream side of valve bore 32 communicates with a passageway 33 which in turn communicates with an outlet 34 leading to reservoir 22 via conduit 36. Thus, it is seen that the valve group 12 is essentially an open center system allowing fluid to pass freely therethrough when none of the mechanisms controlled by the various valve spools are in operation.

A second fluid pump 37 draws fluid from reservoir 22 and delivers it to a branch line 38 via conduit 39. Branch line 38 is in communication with the elevator drive motor 41 and passageway 42 leading to valve spool bore 32. The other side of the hydraulic motor 41 communicates via conduit 43 with a passageway 44 which also leads to bore 32. When valve spool 16 is shifted to the right to either of the forward drive positions (S or F), communication between passageway 33 and valve bore 32 is blocked and the fluid delivered by pump 37 can only return to reservoir 22 through motor 41. The path to the reservoir from motor 41 includes conduit 43, passageway 44, valve bore 32, a connecting passage 46, outlet 34 and conduit 36. In order to prevent the fluid from pump 37 from operating motor 41 (as when operation of the elevator is not desired) spool 16 is urged to the neutral (N) position which provides communication between conduit 38 and passageway 33 via passage 42 and bore 32 whereby the fluid is returned to the reservoir without having to pass through and operate the motor 41.

The foregoing description explains how the motor 41 can be driven at one particular speed in the forward direction (fluid moving from conduit 38 to conduit 43). If it is desired to operate the elevator motor at a higher speed, spool 16 can be shifted so as to combine the output of pump 37 with the output of pump 21 and direct the combined outputs through the motor 41. Pump 21 delivers fluid to input port 24 via conduit 23 as explained above. When both spool 13 and spool 14 are in their neutral positions (the bowl positioning means and ejector not being operated) the fluid entering at port 24 passes into passage 26, through bore 27 into passage 28, and through bore 29 into passage 31. With spool 16 in either the neutral (N) or slow (S) position, fluid in passage 31 passes through bore 32 into passage 33 and back to the reservoir 22. Shifting spool 16 to the extreme rightward position (F), corresponding to fast operation of elevator motor 41, directs the fluid from passage 31 into passage 42 via the enlarged annular portion 51 of bore 32. The fluid flowing into passage 42 enters conduit 38 joining the output of pump 37 which flows into conduit 38 from conduit 39. The combined outputs of pumps 21 and 37 pass through motor 41 on their way back to reservoir 22. In this manner the motor 41 is operated at a speed greater than that attained when the motor is driven by the output of pump 37 alone.

The third possible drive condition of motor 41 is obtained when valve spool 16 is shifted to its leftward most position (R) whereby fluid is directed to pass through motor 41 in the reverse direction (from conduit 43 to conduit 38) and thereby drive the elevator in reverse. With spool 16 in the leftward position the output of pump 37 is ineffective in operating the motor due to conduit 38 being in communication with passage 33 via passage 42 and bore 32S thereby providing a low pressure path by which the fluid can return to the reservoir 22. The fluid supplied by pump 21 is directed to passage 31 as described above and enters enlarged annular portion 52 of bore 32 from which it passes to passageway 44 and conduit 43. From conduit 43 the fluid passes through motor 41 into conduit 38 where it returns back to the reservoir 22 by the same path followed by the output of pump 37. Thus, it is seen that by the proper positioning of a single valve spool 16 the elevator motor 41 can be driven forward at one of two speeds, or it can be driven in reverse.

The output of pump 21 not only serves to enable motor 41 to be driven in reverse, and at a fast speed, but also provides the fluid pressure by which the bowl positioning means and ejection means are operated. The position of spool 13 determines whether or not the bowl positioning means is operating to lower the bowl, raise the bowl, or simply maintain the bowl at a given position. When it is desired to lower the bowl, spool 13 is shifted leftwardly to the lower position (L) whereby communication is provided between passage 26 and an enlarged annular portion 53 in bore 27. The annular portion 53 of bore 27 communicates with a similar enlarged annular portion 54 of bore 29 by way of passage 56. Portion 54 in turn communicates by way of a passage 57, conduit 58 and conduit 59 with the rod ends of a pair of fluid motors 61. Fluid motors 61 are shown schematically and represent the hydraulically driven means for positioning the scraper bowl. Even though fluid pressure is supplied to the rod ends of motors 61 to urge them downward and thereby lower the scraper bowl, the fluid motors are not responsive to fluid pressure unless sequence check valves 62 are properly conditioned. When valves 62 are conditioned to allow fluid motors 61 to operate, communication is established between the motors and conduit 63 by way of connecting conduits 64. Conduit 63 communicates with valve bore 27 through inlet port 66 and passageway 67, and when spool 13 is positioned leftwardly to lower the scraper bowl, passageway 67 communicates with a passageway 68 which leads to reservoir 22 through bore 29, a passageway 69, bore 32 and passageway 33 which is in communication with reservoir 22 as described above. Thus, the communication between fluid motors 61 and conduit 63 provides a means by which fluid in the head ends of motors 61 can be displaced to allow the bowl to be lowered.

Figure 2:
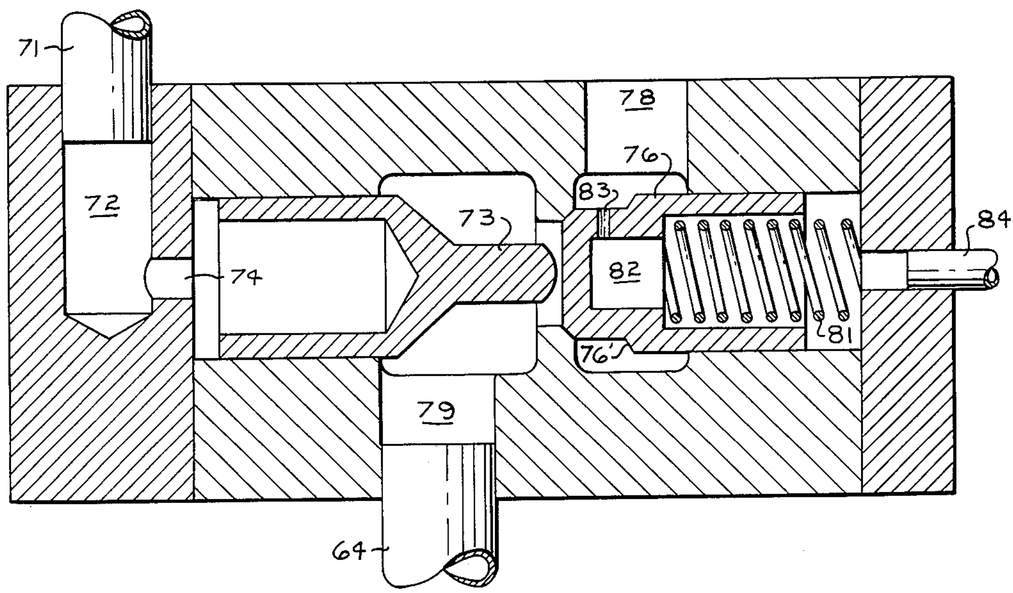
FIG. 2 is a cross-sectional enlargement of a check valve forming part of the control system as shown in FIG. 1.

The manner in which the check valves 62 are conditioned to allow displacement of fluid from the head end of the fluid motors is best seen with reference to FIG. 2 along with FIG. 1. The high pressure fluid in conduit 59 not only acts against the rod ends of fluid motors 61 but also acts on valves 62 through communicating conduits 71. Fluid in a conduit 71 enters a passage 72 which communicates with pilot piston 73 by way of a connecting port 74. As the pressure builds up in passage 72 pilot piston 73 is urged toward a spring loaded check valve 76 and acts against the check valve in a direction urging the check valve open. Check valve 76 is disposed between a passage 78 leading to the head end of fluid motor 61 and a passage 79 connecting to conduit 64. The check valve 76 is urged to its closed position by a spring 81 and fluid in a check valve chamber 82 whereby communication is prevented between passages 78 and 79. Fluid enters check valve chamber 82 by means of a port 83 which communicates with passage 78 such that increased pressure in the head end of a fluid motor increases the forces acting to close the check valve 76. Thus, as the fluid pressure in conduit 59 reaches a value sufficient to overcome the force of spring 81 and the pressure in chamber 82, piston 73 is urged in a direction to open check valve 76 and establish communication between passages 78 and 79. With this condition established, fluid motors 61 can be positioned downwardly and thereby lower the bowl.

For reasons of safety and to facilitate certain service operations, it is necessary that the scraper bowl be lowered when the vehicle engine is stopped and, therefore, the hydraulic pump is not operating. Since the load supporting pressure in fluid motors 61 is communicated to chamber 82 and assists the spring 81 in holding check 76 in its closed position, it is necessary that the chamber 82 be vented to the reservoir 22 when spool 13 is moved to its lower (L) position. For this reason, chamber 82 communicates by means of a conduit 84 with valve bore 27 which in turn communicates with a conduit 86 leading to reservoir 22 via conduit 36. When valve spool 13 is positioned leftwardly, corresponding to the position for lowering the bowl, communication will be established between conduits 84 and 86 through bore 27 so as to vent the fluid in chamber 82. At this time the pressure in passage 78 acts against a shoulder 76′ on the check valve 76 to overcome the force of spring 81 and open the check valve to communicate the head end of fluid motors 61 with the reservoir by way of passages 78 and 79, conduit 64 and 63, valve 12 and conduit 36. Venting of the pressure from chamber 82 when spool 13 is moved to the lower position during normal operation of the vehicle also reduces the pressure required to open check valve 76 by action of the piston 73.

When it is desired to raise the bowl, spool 13 is moved rightwardly to the raise (R) position whereby communication is established between inlet port 24 and passage 67 communicating with conduit 63. Pressure fluid is presented to sequence check valve 62 where the fluid operates to counteract the force of check valve springs 81 and enable pressure fluid to enter the head end of fluid motors 61 urging them upwardly. The fluid displaced from the rod ends of motors 61 passes through conduit 58 to passage 57 and into annular portion 53 by way of connecting passage 56. With spool 13 in the (R) position, communication exists between the enlarged portion 53 and a passage 88 which communicates through bore 29 with a passage 89 which in turn communicates through bore 32 with a passage 46 leading to conduit 36 and reservoir 22. Thus, the fluid displaced from the motors returns to reservoir 22.

A fluid motor 91 represents the means for effecting ejection of material from the scraper bowl during the unloading portion of the work cycle. Some ejection mechanisms are operated by a single fluid motor, or a plurality of fluid motors operated simultaneously, whereas other ejection mechanisms are operated by more than one fluid motor wherein the fluid motors are operated in a particular sequence. The description directed to FIG. 1 deals with a single fluid motor ejection mechanism whereas the description to be given in conjunction with FIG. 3 below deals with a mechanism requiring sequential operation of two fluid motors.

When the scraper bowl is full of material and ejection is desired, spool 14 is moved leftwardly to the eject (E) position whereby communication is established between passageway 28 and passageway 57. The pressure fluid from pump 21 entering inlet 24 will pass through passageway 26 to passageway 28 and by virtue of the communication mentioned above will enter passageway 57 and thus into conduit 58. Since conduit 58 communicates with conduit 59 pressure fluid is received by the rod ends of fluid motors 61. The pressure fluid will not operate to position the fluid motors 61, however, since conduit 63 is blocked by spool 13 and prevents displacement of fluid from the head end of the motors.

Also communicating with conduit 58 is a conduit 92 which leads to the rod end of fluid motor 91 and to a sequence check valve 93 associated with fluid motor 91. The pressure in conduit 92 urges the fluid motor 91 to retract while the pressure presented to check valve 93 opens the valve to provide communication between the head end of motor 91 and a conduit 94. Check valve 93 is essentially the same in operation as previously described check valve 62. Conduit 94 communicates through passage 96 with bore 29 which in turn communicates with passage 69 when spool 14 is in the eject position. Passageway 69 communicates with passageway 33 which leads to reservoir 22 whereby a path is established by which fluid displaced from the head end of motor 91 can return to the reservoir 22. The check valve 93 is necessary to prevent the ejection means from operating due to forces acting against the scraper bowl during its operation.

When the material from the scraper bowl has been ejected and the ejection means is to be returned to its original position, spool 14 is shifted rightwardly to the return (R) position whereby the pressure fluid existing in passage 28 passes through bore 29 to passage 96 leading to conduit 94 and from there to the head end of motor 91 through check valve 93. The motor 91 is extended by virtue of the pressure fluid presented in the head end of the motor and the fluid displaced in the rod end of the motor returns to the reservoir 22 through conduit 92, conduit 58, passage 57, bore 29, passage 89, bore 32, passage 46, and conduit 36. It can be seen that when the spool 14 is in the neutral (N) position conduit 94 will be blocked from communication with passageway 69 so as to prevent the displacement of fluid in the head end of motor 91 and thus prevent pressure fluid in conduit 92 from operating the ejection means.

During a normal work cycle of the scraper the following sequence of operations will generally occur: the bowl selector spool 13 will be moved to the lower (L) position causing fluid from motor 21 to operate fluid motors 61 until the proper depth of cut has been achieved; the bowl selector 13 will then be returned to the neutral position and the elevator spool selector 16 will be moved to operate the elevator motor 41 at either the slow or fast speed depending upon the conditions under which operation is occurring (it is to be noted that the motor 41 can only be operated at the slow speed when either the bowl position spool 13 or ejector actuation spool 14 is in any position other than neutral); when the bowl has been filled with material the elevator selector spool 16 will be returned to its neutral position and the bowl selector spool 13 will be urged to its (R) position to place the bowl in condition to enable the material to be transported to the dump location; when the scraper has reached the dump location the ejector selector 14 will be positioned to the ejection position whereby fluid from motor 21 will be supplied to fluid motor 91; the elevator motor 41 may be operated in a reverse direction during the ejection portion of the cycle if the material being ejected is of such nature or consistency as to require assistance in being ejected; then the ejector will be returned to its position by positioning selector 14 to the return (R) position. It may be necessary during the transportation of the material from the load location to the dump location to operate the elevator motor to prevent loose material from spilling out of the front of the scraper. This is accomplished by merely positioning the elevator selector spool 16 to either one of the forward positions (S or F) during the transportation of the material.

Figure 3:
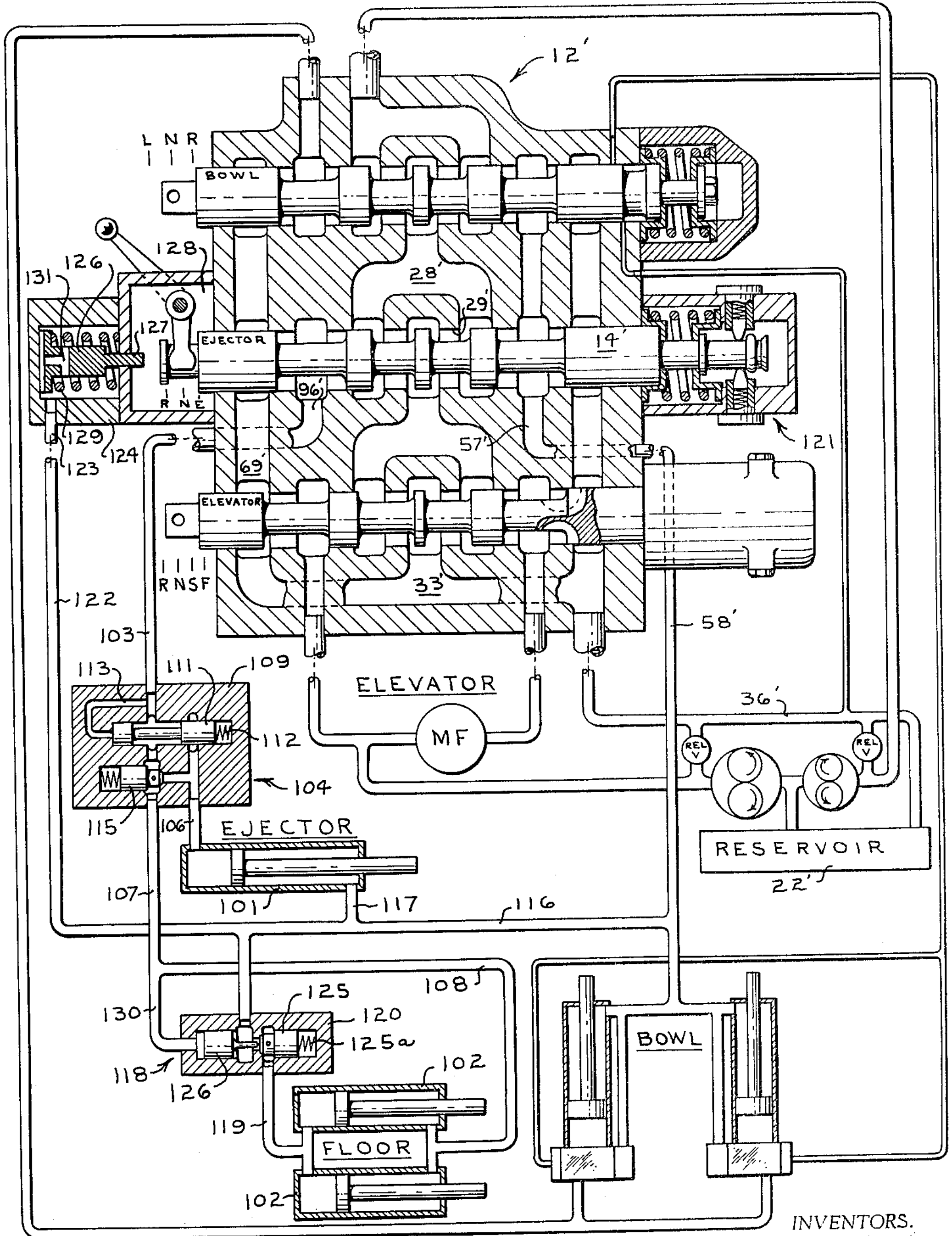
FIG. 3 is a schematic illustration of the control system of the present invention similar to FIG. 1 but employed in conjunction with an ejection system which includes two hydraulically driven mechanisms which must be properly sequenced.

As mentioned above some self-loading scraper designs employ ejection means which require a plurality of fluid motors which must be operated sequentially for most efficient operation. A hydraulic control system for such a scraper design is shown in FIG. 3 wherein a single fluid motor 101 is responsible for operating an ejector while a pair of fluid motors 102 operate a movable floor panel to provide an opening for the discharge of earth materials. When the scraper bowl is full of material and it is desired to discharge this material the desired sequence of events includes the fluid motors 102 opening the floor panel and then the ejector fluid motor 101 operating the ejector so as to discharge the material through the opening provided by the movement of the floor panel. When all the material has been discharged from the scraper bowl it is then desirable to have the ejector return to its initial position and the floor panel close, in that order.

The system of FIG. 3 is seen to be the same as that illustrated in FIG. 1 with the exception of the components controlled by the position of ejection spool 14'. Movement of spool 14' rightwardly to the eject (E) position results in communication between passageway 28' and passageway 96' through bore 29' so as to introduce fluid pressure into conduit 103. Conduit 103 communicates with a sequence valve 104 which in turn communicates with the head end of ejector fluid motor 101 via conduit 106. Conduit 103 also communicates through valve 104 with the rod end of fluid motors 102 via conduits 107 and 108. The sequence valve 104 includes a valve body 109 having a valve spool 111 slidably disposed therein. The valve spool 111 is urged leftwardly by a valve spring 112 and urged rightwardly by the fluid pressure in conduit 103 which communicates with the end of valve spool 111 via a connecting passage 113. When the spring 112 provides a force greater than that applied to the valve spool by the fluid pressure in conduit 113, spool 111 will be in its leftward position so as to block communication between conduits 103 and 106. Under these conditions fluid pressure is supplied to the rod ends of the floor panel fluid motors 102 so as to retract the fluid motors and thereby open the floor panel (the operation of valve 118 to provide a path for displaced fluid is set out below). When the fluid motors 102 reach the end of their stroke the pressure in conduits 108, 107 and 103 will rise. The increase in pressure in conduit 103 increases the force applied to spool 111 urging the spool rightwardly. When sufficient pressure is established in passage 113 to shift spool 111 rightwardly, conduits 103 and 106 will communicate enabling pressure fluid to reach the head end of ejector fluid motor 101. The motor 101 will extend and operate the ejector to discharge material from the scraper bowl. By virtue of the action of sequence valve 104 the desired events—the floor opening first and then the ejector discharging material—is provided for.

After the material in the bowl has been discharged the valve spool 14' is moved leftwardly to the return (R) position whereby communication is established between passageway 28' and passageway 57' providing pressure fluid in conduit 58'. Conduit 58' communicates with the rod end of ejector fluid motor 101 via conduits 116 and 117 so that fluid pressure is immediately available to the ejector fluid motor 101 to cause it to retract and return the ejection mechanism to its original position. The fluid displaced from the head end of fluid motor 101 passes through conduit 106 into conduit 103 via check valve 115 and from there to passageway 96', bore 29', passage 69', passage 33', and conduit 36' to reservoir 22'. Conduit 116 further communicates with a sequence check valve 118 associated with fluid motors 102 and disposed between conduit 116 and the head ends of the fluid motors.

Valve 118 corresponds to that shown in FIG. 2 and includes a valve body 120 with a check valve 125 slidably disposed therein. A valve spring 125*a* urges check valve 125 leftwardly and a piston 126 is exposed to pressure in a conduit 130 and urges the check valve to the right. When the spring force dominates, check 125 is in its leftward position and communication is blocked between conduit 119 and conduit 116. When pressure exists in conduit 130 by virtue of pressure in conduit 107 and the pressure is of sufficient magnitude, piston 126 will shift check valve 125 rightwardly and communication will be established between the head ends of fluid motors 102 and conduit 116. The valve 118 provides protection against loading force and also aids in the proper sequencing of events.

By the proper choice of a spring constant for spring 125*a* the pressure sufficient to provide communication between conduit 116 (the source of pressure) and the head ends of the fluid motors 102 will occur when the ejector fluid motor 101 has reached the end of its return stroke. Once communication is established between the source of supply and the fluid motors 102 the floor panel positioned by the fluid motors is returned to its initial position. Once again the desired sequence of events has taken place.

Since the return of the ejection mechanism from its extreme ejection position does not require the attention of the vehicle operator it is most advantageous to have this part of the operating cycle take place automatically. For this purpose a detent mechanism shown generally at 121 is provided at one end of valve spool 14' such that movement of the spool to the (R) position causes the detent mechanism 121 to hold the valve spool without the continued attention of the operator. When the ejection mechanism has been returned to the original position, the fluid pressure in conduit 116 will begin to rise and cause a like rise in fluid pressure in a conduit 122 which communicates with conduit 116. Conduit 122 leads through a port 123 to a housing 124 which is coaxially disposed at one end of valve spool 14'. Disposed within housing 124 is a piston 126 which has an extending portion 127 which protrudes through the housing 124 into a chamber 128 which contains the end of valve spool 14'. Piston 126 is normally maintained in a retracted position by virtue of a spring 129 but can be urged rightwardly by fluid pressure building up in a chamber 131 behind the piston 126. Thus, as the fluid pressure rises in conduit 122 the fluid pressure in chamber 131 behind piston 126 will also rise and by a proper choice of spring constant for spring 129 the piston 126 can be urged rightwardly when the ejection mechanism has been returned to its desired position. The rightward movement of piston 126 causes contact between the extension 127 and spool 14' and dislodges the spool from the detent mechanism 121 and causes the spool 14' to assume its neutral position.

Figure 4:
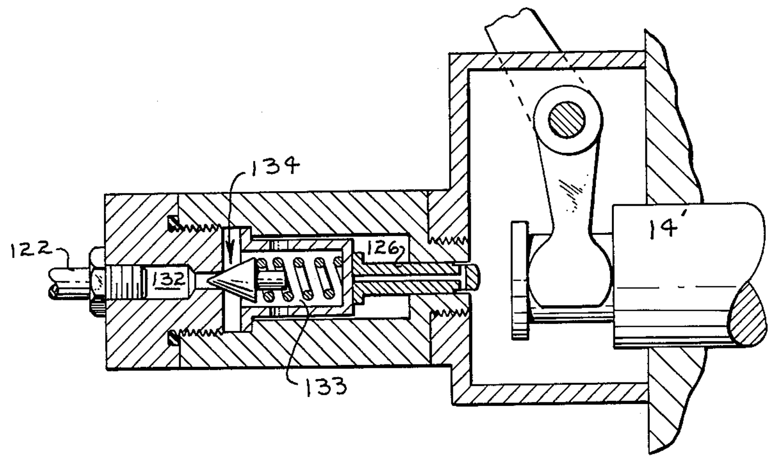
FIG. 4 is a cross-sectional illustration of a kick-out valve which is advantageously employed with the invention.

In order to prevent sudden increases in pressure in conduit 116 from dislodging spool 14' from its (R) position prematurely, an arrangement as shown in FIG. 4 can be advantageously substituted for the arrangement as shown in FIG. 3. As shown in FIG. 4 conduit 122 leads into a first chamber 132 which is separated from a chamber 133 by a check valve 134. When the pressure in line 122 increases sufficiently to open check valve 134 fluid pressure is admitted to chamber 133 where it acts to urge piston 126 rightwardly so as to contact valve spool 14' and remove it from its (R) position and place it in its (N) position.

While the foregoing systems are seen to provide a means for controlling the various components of a tractor-scraper and provide it with very versatile operating characteristics, there are several other features of the invention which are of importance. The provision of an open center elevator control spool 16 by which the motor 41 is connected to the reservoir 22 when the spool is in a neutral position, prevents peak pressures from being developed in the elevator drive circuit when the control spool is abruptly shifted from one of its operating positions to the neural position. Referring to FIG. 1, valve spool 16 is provided with throttling slots 141 between the enlarged annular portion 52 and port 46 leading to reservoir return conduit 36. These throttling slots enable the spool 16 to be shifted from one of its forward drive positions (S or F) to the neutral position without causing excessive pressures to build up in conduit 38. In other words, throttling slots 141 cause the motor to decelerate over a period of time rather than come to an abrupt halt. During this deceleration period cavitation of motor 41 is prevented since the fluid output of pump 37 is bypassed to reservoir 22 through line 38 and is therefore available to the motor. When spool 16 is returned to the neutral position from the reverse (R) position the discharge port of motor 41 is in communication with the reservoir 22 through line 38, passage 42, passage 33 and line 36. Motor 41 can at this time draw fluid from passage 33 by way of slots 141 and line 143 to prevent cavitation from occurring.

What is claimed is:

1. In an hydraulic control system including an hydraulically driven motor and at least one other hydraulically driven mechanism, the combination comprising:
   - a first source of hydraulic fluid pressure;
   - a second source of hydraulic fluid pressure;
   - a first valve means communicating with said first source;
   - a second valve means communicating with said first valve means;
   - said first valve means communicating with the hydraulically driven mechanism and operable in one of its positions to communicate said first source with the mechanism;
   - said first valve means having a second position in which communication is established between said first source and said second valve means through said first valve means;
   - means communicating said second source to said second valve means, and said motor to both said second source and said second valve means; and means communicating said second valve means with a low pressure sump;
   - said second valve means having a first position in which fluid from said second source and said first valve means are directed to said sump without passing through the motor, a second position in which fluid from said second source is directed through the motor while fluid from said first valve means is directed to said sump without passing through the motor; a third position in which both the fluid from said second source and first valve means is directed through the motor, and a fourth position in which the fluid from said first valve means is directed through the motor and the fluid from said second source is bypassed to said sump.

2. In a self loading scraper the combination comprising;
   - a hydraulically operated ejector drive mechanism;
   - a hydraulically operated scraper bowl lift mechanism;
   - a hydraulically operated conveyor motor;
   - a first source of hydraulic fluid pressure;
   - a second source of hydraulic fluid pressure;
   - valve means hydraulically communicating with said ejector drive mechanism, said bowl lift mechanism, said conveyor motor, said first source, and said second source;
   - a first valve selector means forming a part of said valve means and hydraulically disposed between said first source of fluid pressure and said bowl lift mechanism, said valve means responsive to said valve selector means being positioned to one of its operative positions to direct fluid from said first source to said bowl lift mechanism for operation thereof, said valve means responsive to said selector valve means being positioned to another of its operative positions to direct fluid from said first source to another portion of said valve means;

a second valve selector means forming a part of said valve means and hydraulically disposed between said first valve selector means and said ejector drive mechanism, said valve means responsive to said second valve selector means being positioned to one of its operative positions to direct fluid from said first valve selector means when said first valve selector means is in another operative position, to said ejector drive mechanism, said valve means responsive to said second valve selector means being positioned to another operative position to direct fluid to another part of said valve means; and third valve selector means forming a part of said valve means and hydraulically communicating with said second valve selector means, said second source of hydraulic fluid pressure and said conveyor motor, said third valve selector means having a first operative position in which said second source is communicated with said conveyor motor for conveyor motor operation at one speed, said third valve selector means having a second operative position in which said second source and said second valve selector means are communicated with said conveyor motor for conveyor motor operation at another speed.

References Cited by the Examiner

UNITED STATES PATENTS

| | | | |
|---|---|---|---|
| 2,103,530 | 12/1937 | Henry | 60—52 |
| 2,979,908 | 4/1961 | Shook | 60—97 |
| 3,032,994 | 5/1962 | Lindell | 37 |
| 3,143,814 | 8/1964 | Brinkmeyer et al. | 37 |
| 3,210,869 | 10/1965 | Hein | 37—8 |

ABRAHAM G. STONE, *Primary Examiner.*

BENJAMIN HERSH, ANTONIO F. GUIDA, *Examiners.*

W. B. STONE, W. A. SMITH III, *Assistant Examiners.*